INVENTOR.
Gerhard Stampe

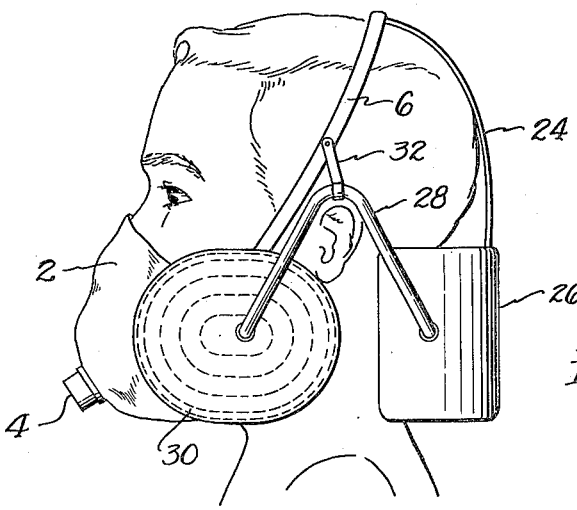
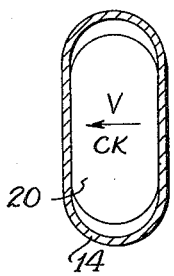
Fig. 4
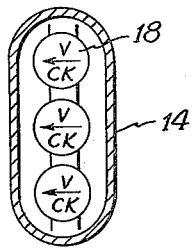
Fig. 5
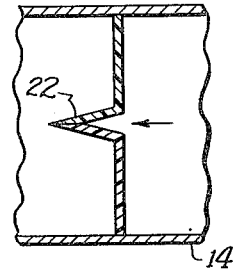
Fig. 6
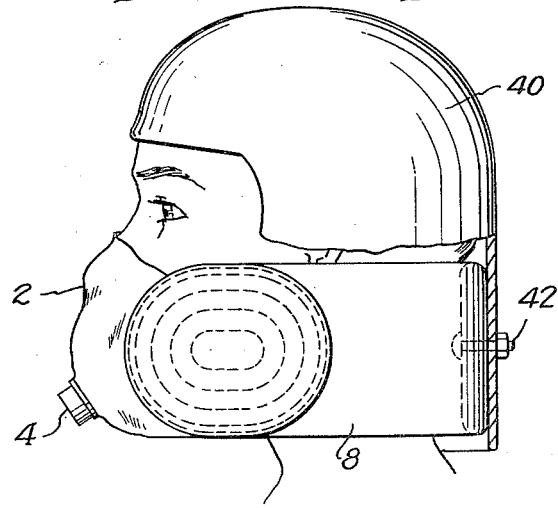

United States Patent Office 2,811,967
Patented Nov. 5, 1957

2,811,967
MASK WITH DUST FILTER

Gerhard K. E. H. Stampe, Lubeck, Germany, assignor to Firma Dragerwerk, Heinr. & Bernh. Drager, Lubeck, Germany Application January 5, 1954, Serial No. 402,201

3 Claims. (Cl. 128—146)

This invention relates to dust filters. In particular, it is directed to a respirator face mask.

Conventional dust respirators generally comprise a half-face mask carrying the dust filter in a container. In some types, the face mask is provided with a fitting, such as a threaded fitting, to which a dust filter attachment is connected. The primary disadvantage of these respirators is that the filter element is supported entirely by the face mask. A further disadvantage is that the filter container cannot exceed a certain size in order to not over-burden the mask, and particularly not to interfere with the field of vision. This produces further disadvantages in that the filter element is so small that it offers a relatively high resistance to the passage of air therethrough. Attempts to enlarge the filter have not been practical because of the difficulties of supporting the same on the mask.

Other types of filters are those which are carried on the back of the user, the filter being carried in a sack having a hose connection fitting. Two hoses extend from the sack over the shoulders, and over either side of the neck to a half-face mask. The filter sack, made of woven fabric, filters out coarse dust particles but not all of the fines. Moreover, such respirators hinder the activities of the wearer.

The objects of the instant invention are to produce a dust respirator which does not have the disadvantages of the types described, and which is efficient and scarcely hinders the activities of the wearer.

In general, these objects are obtained by forming a respirator composed of a half-face mask, and a coarse filter element extending from the face mask around the neck of the wearer. This coarse filter is composed of a hose of a flattened cross-section, and constructed of a woven fabric placed over a spring coil. Air passing through the cloth is filtered of coarse dust particles. Adjacent the cheek portion of the face mask the coarse filter connects with a flattened tube containing the fine dust filter, and the outlet from this tube extends directly into the face mask. Check valves are placed in the outlets of the fine filters so that exhaled air cannot pass back through the filter. The fine dust filter located in the cheek portion of the mask can be given such a large area, that together with the large area of the coarse filter, the resistance to the passage of air is reduced to from 1 to 2 mm. of water at normal inhaling rates. The mask is of light weight, does not materially hinder the activity of the user, and does not obscure the vision.

Figure 1:
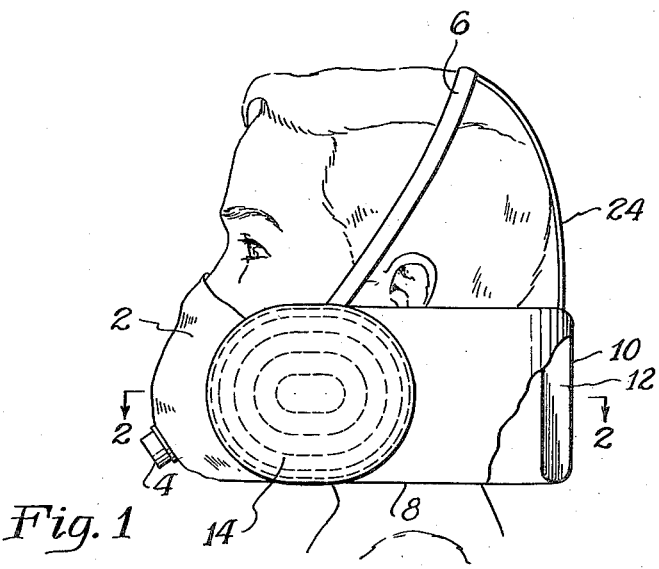
Figure 2:
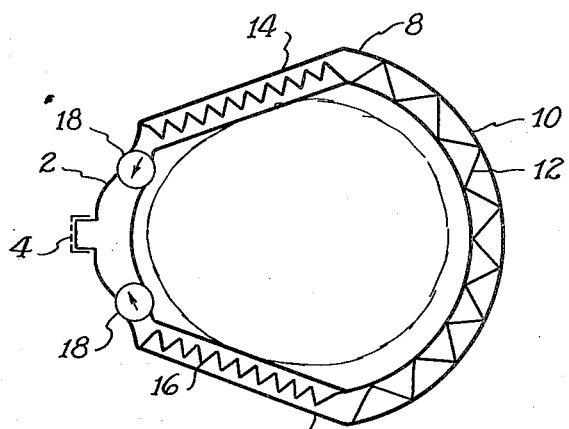

The means by which the objects of the invention are obtained are described more fully with respect to the accompanying drawings, in which Figure 1 is a side view of the respirator, Figure 2 is a cross-sectional view on the line 2—2 of Figure 1, Figure 3 is a side view of a modified form of respirator, Figure 4 is a cross-sectional view of one form of check valve, Figures 5 and 6 are cross-sectional views of modified forms of check valves, and Figure 7 is a side view of another form of respirator.

As shown in Figures 1 and 2, the respirator is composed of a half-face mask 2 having an exhaust valve 4, and held in place by head straps 6. The filter 8 is connected to the cheek portions of the mask 2, and extends around the neck of the wearer but is spaced therefrom. This filter is in the shape of a flattened hose and is composed of a coarse filter portion constructed of woven fabric 10 stretched over a spring 12. Air can enter this tube through the fabric entirely about its circumference and its entire length, and be filtered of coarse dust particles. The ends of this tube are connected, respectively, to fine filter tubes 14. These tubes are composed of a material which is impervious to the passage of air and which preferably is flexible. Within each tube 14 is a fine dust filter 16 which has its ends attached to opposite sides of the tube so as to force all the air to pass through the filter. The surface area of this fine filter is made as large as possible by folding the filter into the form of accordion pleats. Compactness is obtained by the fact that this filter is enclosed within the over-all tube which extends from face mask 2 around the neck of the wearer. Check valves 18 are inserted between the outlet of the fine filter tube and the face mask in order to prevent exhaling air from being pushed back through the filter, such exhaling air leaving the mask through exhaust valve 4.

As shown in Figure 5, it is desirable to provide a plurality of check valves 18 in parallel so that there will be very little resistance to the passage of air. In some constructions of the mask, where the tube 14 merges directly into mask 2, it is preferable to use a large check valve 20, as shown in Figure 4, or to use a lip valve 22, as seen in Figure 6.

The coarse filter tube is additionally supported by a strap 24 extending between the filter tube and the head band 6. In Figure 3 the filter element 26 is a separate unit located adjacent the back of the neck, being supported by strap 24 joined to head band 6, and is connected to the face mask by hoses 28 which extend over the ears. These tubes carry the air, which has been filtered of coarse particles, into the fine particle filter 30, attached to face mask 2.

The hoses 28 are supported by straps 32 extending between the hoses and the head strap 6.

In Figure 7 the filter element 8 is attached to and supported by the cap or helmet 40 by bolts 42. The filter element can be wholly within or partially within the cap or helmet, and has the advantage that it will be protected from mechanical damage as might be had from falling rocks or the like.

In all the embodiments of the invention the filter element has sufficiently large areas to reduce the resistance to in-coming air down to 1 to 2 mm. of water at normal inhaling rates. The mask and filter is of light weight and neither impedes the vision nor the normal activity of the user. The device follows all movements of the head so the individual parts of the respirator are not displaced relative to each other.

Having now described the means by which the invention has been obtained, I claim:

1. A dust respirator comprising a half-face mask, a hose having a flattened cross-section with its free ends communicating with said face mask and being shaped to extend around the neck portion of a wearer thereof, a fabric stretched over a wire spiral and forming a coarse dust filter on a portion of said hose, and an accordion pleated member extending longitudinally in said hose and forming a fine dust filter in said hose between said coarse dust filter and said mask.

2. A dust respirator as in claim 1, further comprising an elastic tube portion impermeable to air enclosing said pleated member.

3. A dust respirator as in claim 2, further comprising check valve means between said pleated member and said mask.

References Cited in the file of this patent

UNITED STATES PATENTS

| | | |
|---|---|---|
| 1,288,856 | Farr | Dec. 24, 1918 |
| 2,148,431 | Brown | Feb. 28, 1939 |
| 2,206,061 | Splaine | July 2, 1940 |
| 2,216,619 | Lehmberg | Oct. 1, 1940 |
| 2,671,445 | Charbonel | Mar. 9, 1954 |
| 2,764,153 | Stampe | Sept. 25, 1956 |

FOREIGN PATENTS

| | | |
|---|---|---|
| 22,944 of 1913 | Great Britain | June 17, 1915 |
| 27,118 of 1896 | Great Britain | Oct. 16, 1897 |
| 89,613 | Sweden | June 29, 1937 |